United States Patent
Wetmore et al.

(10) Patent No.: US 9,495,366 B2
(45) Date of Patent: Nov. 15, 2016

(54) SYSTEM FOR DISTRIBUTING DIGITAL MEDIA TO EXHIBITORS

(75) Inventors: Robert Evans Wetmore, Manhattan Beach, CA (US); Michael Radford, Los Angeles, CA (US); James Radford, Fountain Valley, CA (US); Lev D. Lvovsky, Playa Del Rey, CA (US); J. Richard Glass, Edmonds, WA (US)

(73) Assignee: FOX DIGITAL ENTERPRISES, INC., Los Angeles, CA (US)

( * ) Notice: Subject to any disclaimer, the term of this patent is extended or adjusted under 35 U.S.C. 154(b) by 1030 days.

(21) Appl. No.: 12/328,205

(22) Filed: Dec. 4, 2008

(65) Prior Publication Data

US 2009/0144542 A1 Jun. 4, 2009

Related U.S. Application Data

(60) Provisional application No. 61/005,260, filed on Dec. 4, 2007.

(51) Int. Cl.
*H04L 9/00* (2006.01)
*G06F 17/30* (2006.01)
*G06F 21/10* (2013.01)

(52) U.S. Cl.
CPC ......... *G06F 17/30056* (2013.01); *G06F 21/10* (2013.01); *H04L 2209/60* (2013.01)

(58) Field of Classification Search
CPC ............. G06F 17/30056; G06F 21/10; H04L 2209/60
USPC .......... 380/44, 210, 277, 279; 713/155, 156; 726/27–28
See application file for complete search history.

(56) References Cited

U.S. PATENT DOCUMENTS

| | | | |
|---|---|---|---|
| 6,868,403 B1 | 3/2005 | Wiser et al. | |
| 2003/0204750 A1* | 10/2003 | Ng et al. | 713/201 |
| 2003/0223583 A1* | 12/2003 | Stirling et al. | 380/216 |
| 2004/0024652 A1 | 2/2004 | Buhse et al. | |
| 2007/0171374 A1* | 7/2007 | Moore et al. | 352/40 |
| 2007/0220575 A1* | 9/2007 | Cooper et al. | 725/118 |
| 2010/0247070 A1* | 9/2010 | Ogura et al. | 386/83 |

FOREIGN PATENT DOCUMENTS

| | | |
|---|---|---|
| KR | 1020070089426 | 2/2006 |
| KR | 1020070003518 | 1/2007 |

OTHER PUBLICATIONS

Written Opinion and International Search Report of the International Searching Authority: PCT/US2008/085511; Jun. 25, 2009.
Examination Report for Application No. GB1008676.7 dated Jul. 26, 2012, 3 pages.
J. Hart, et al., Inter-Society Digital Cinema Forum (ISDCF), Digital Cinema Primer, Mar. 2007, http://www.isdcf.com/papers/DigitalCinemaPrimerShoWest2007.pdf, 22 pages.
GB Application No. GB1300718.2, Combined Search and Examination Report dated Jan. 29, 2013, 3 pages.
Canadian Application No. 2,706,888 Office Action dated Apr. 13, 2015, 3 pages.
GB Application Nos. GB1008676.7 and GB1300718.2, Decision of Refusal dated Jul. 16, 2013, 11 pages.
Canadian Patent Application No. 2,706,888 Office Action dated Aug. 5, 2016, 5 pages.

* cited by examiner

*Primary Examiner* — Teshome Hailu
(74) *Attorney, Agent, or Firm* — Cantor Colburn LLP

(57) ABSTRACT

A system for packaging digital media and distributing digital media to exhibitors is described, which system enables distribution by utilizing media content booking, media content packaging, encryption, and delivery components.

51 Claims, 9 Drawing Sheets

SYSTEM FOR DISTRIBUTING DIGITAL MEDIA TO EXHIBITORS

CROSS REFERENCE TO RELATED APPLICATION

The present application claims priority to U.S. Provisional Patent Application Ser. No. 61/005,260, filed Dec. 4, 2007, the entire contents of which are specifically incorporated by reference herein.

BACKGROUND

A number of significant technology developments have occurred in the past few years that have enabled the digital playback and display of feature films at a level of quality commensurate with that of 35 mm film release prints. These technology developments include the introduction of high resolution film scanners, digital image compression, high speed data networking and storage, and advanced digital projection. These digital cinema systems are local, in-cinema playback and display systems.

While these systems are effective in-cinema, there has not previously existed a system that would enable secure and effective distribution of digital media to exhibitors.

SUMMARY

The above-described and other problems and deficiencies of the prior art are overcome and alleviated by the presently described system for distributing digital media to exhibitors. This system enables distribution by utilizing media content booking, media content packaging, encryption, and delivery components.

In exemplary embodiments, a packaging platform and a movie cryptographic administration platform interact to generate and provide distributed content. An exemplary packaging platform may transform digital cinema digital masters (DCDMs) into encrypted digital cinema packages (DCPs), which may be distributed and viewed at remote locations. An exemplary packaging component may watermark, compress and or encrypt various movie components, such as picture, sound and subtitles together or separately, for example in a material exchange format (MXF). Also, various versions of such components may be generated (e.g., excluding video content, substituting video content, various sound or subtitling content, etc.). Thus, in exemplary embodiments, digital distribution to theaters may comprise multiple MXF files (e.g., one or more specified picture files, sound files, and/or subtitle files) as well as other files. Such other files may comprise one or more of, e.g., a packaging list (PKL) file, an asset map (AST) file, and a composition playlist (CPL) file, which includes appropriate assembly instructions for proper playback of a movie version.

For booking and delivery of a movie version, in exemplary embodiments, a central component interfaces with a booking system to establish booking information. The interaction establishes booking information including the type of digital media an exhibitor can display, the version and final booking data. The content is encrypted, and the central component generates encryption keys necessary to exhibit the digital media. The encryption is performed so that the exhibitor must obtain a corresponding key for that exhibitor and that booking in order to access the digital media.

BRIEF DESCRIPTION OF THE DRAWINGS

Referring now to the drawings, wherein like elements are numbered alike in the following FIGURE:

FIG. 3 is an exemplary screenshot of a CPL generator;

FIG. 5 is an exemplary screenshot of a versions manager;

FIG. 6 is an exemplary screenshot of an interface permitting linking and unlinking of versions and CPLs;

Figure 8:
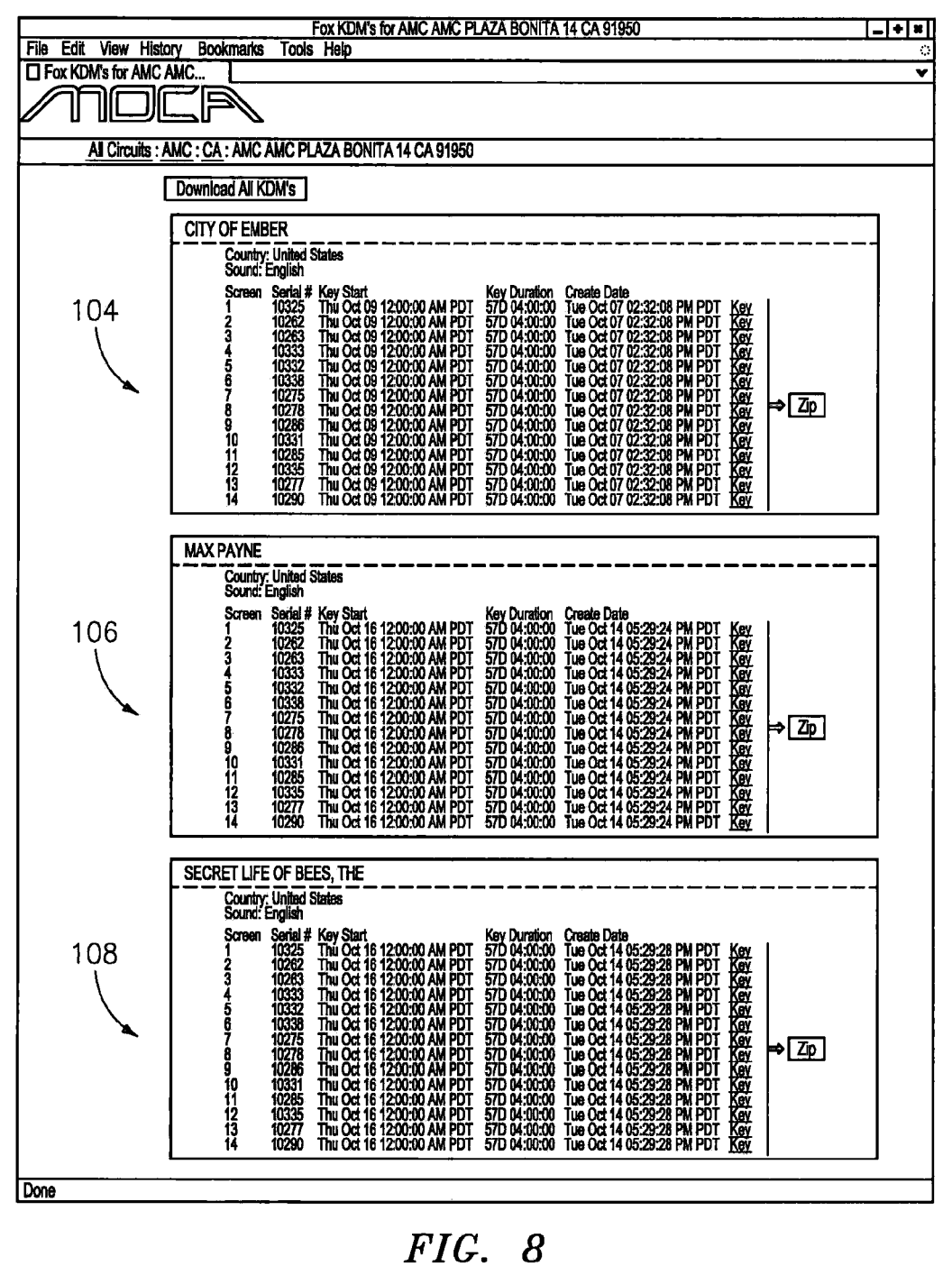

FIG. 8 is an exemplary screenshot detailing KDM deliveries for a specific exhibitor; and FIG. 9 is an exemplary log screenshot listing delivered KDMs for all vendors.

DETAILED DESCRIPTION OF EXEMPLARY EMBODIMENTS

Reference will now be made in detail to exemplary embodiments, examples of which are illustrated by the accompanying drawing.

Figure 1:
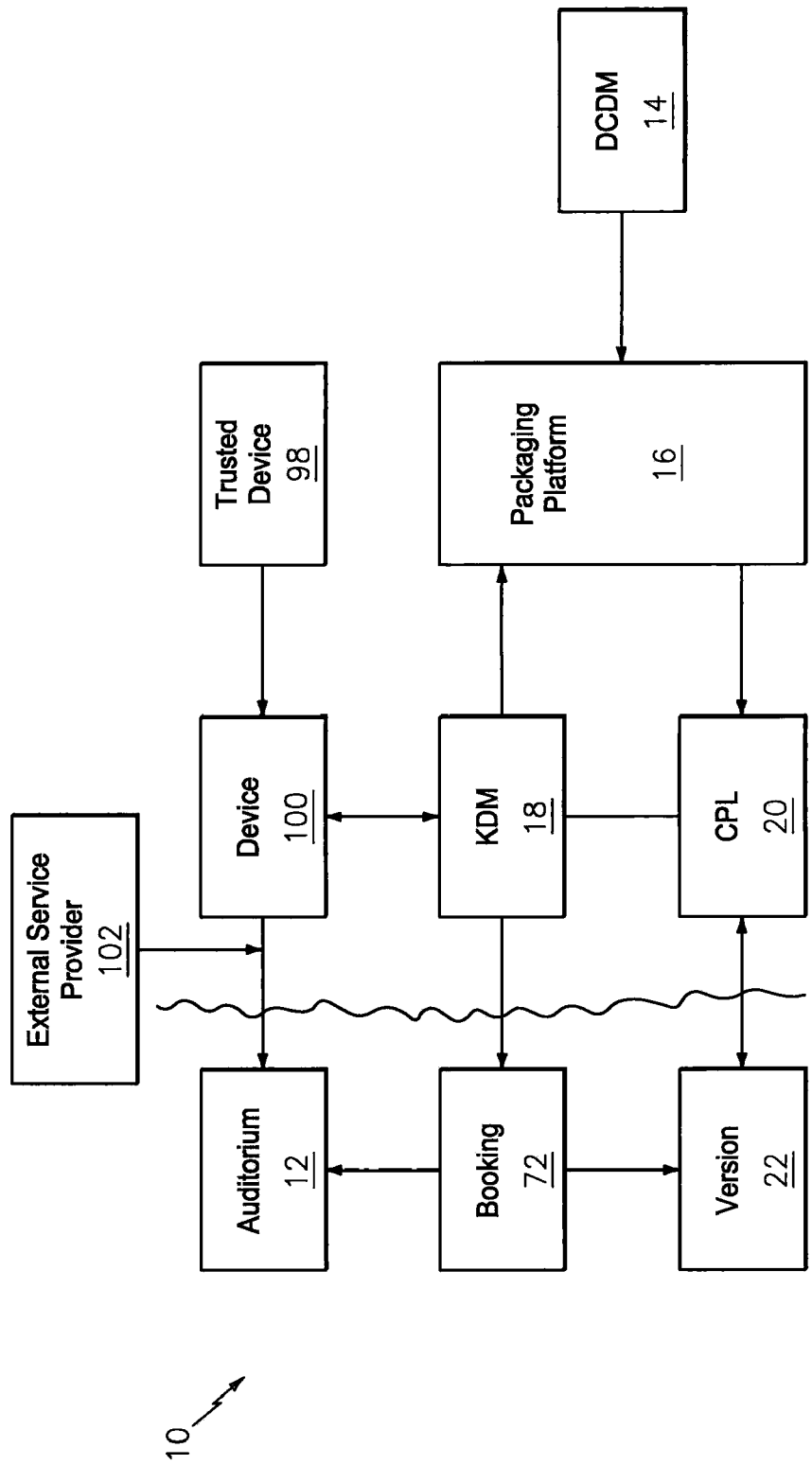
FIG. 1 is an exemplary flowchart illustrating exemplary interaction of an exemplary digital cinema system with packaging, encryption, booking and delivery components'

Referring now to FIG. 1, an example of the presently described digital cinema system is illustrated generally at 10. The illustration provides a flowchart detailing interaction of various components ultimately for the provision of digital cinema to an auditorium 12. The following description will focus on an exemplary distribution of digital movie distribution derived from a digital cinema digital master (DCDM) 14, as may be created by a movie studio. However, it should be recognized that various components described below, including packaging components and/or booking and delivery components, may be used separately for distribution or packaging of various types of digital content. Accordingly, the below description is merely an exemplary, non-limiting configuration.

Referring now to FIG. 1, an exemplary packaging platform is illustrated at 16. A user or studio may input a DCDM 14 into the platform 16, which in exemplary embodiments is secure from outside systems due to the value of such masters and packaged components. In exemplary embodiments, the DCDM is automatically compressed and encrypted upon input into the packaging platform to ensure that the uncompressed and unencrypted master material will not be compromised later in the system. In exemplary embodiments, the DCDM material is converted to one or more encrypted material exchange format (MXF) files (MXF files may be generated according to a reel count, such as: Movie A, reel 2 of 6, and/or may also represent components of a film, such as Movie A, picture version 3, or Movie A, sound version 2, or Movie A, subtitle Spanish). The generation of an exemplary MXF may also entail compression and/or watermarking of the file.

The packaging platform 16 may also have independent and/or secure access to a digital encryption key platform (KDM proxy (knowledge discovery meta-model)) 18 to permit authorized personnel to manipulate the encrypted MXF files. In an exemplary embodiment, the KDM automatically provides keys to authorized users or workstations when manipulation of MXF files is performed within a secure environment (such that authorized users may work with MXFs, edit instructions for manipulating MXFs and arrange plural MXFs without the perceived need to request authorized keys from the KDM).

The packaging platform 16 ultimately generates packaging instructions (CPL) 20 for generating one or more movie versions 22. Thus, a version 22 of a movie that ultimately is distributed to an auditorium 12 may comprise multiple MXFs and a composition playlist (CPL) (assembly instructions). Other files may also be transmitted, such as a packaging list (PKL) and/or an asset map (AST). The CPL chooses which MXFs will be displayed and when such MXFs will be displayed (at the same time, but potentially offset relative to one another).

Figure 2:
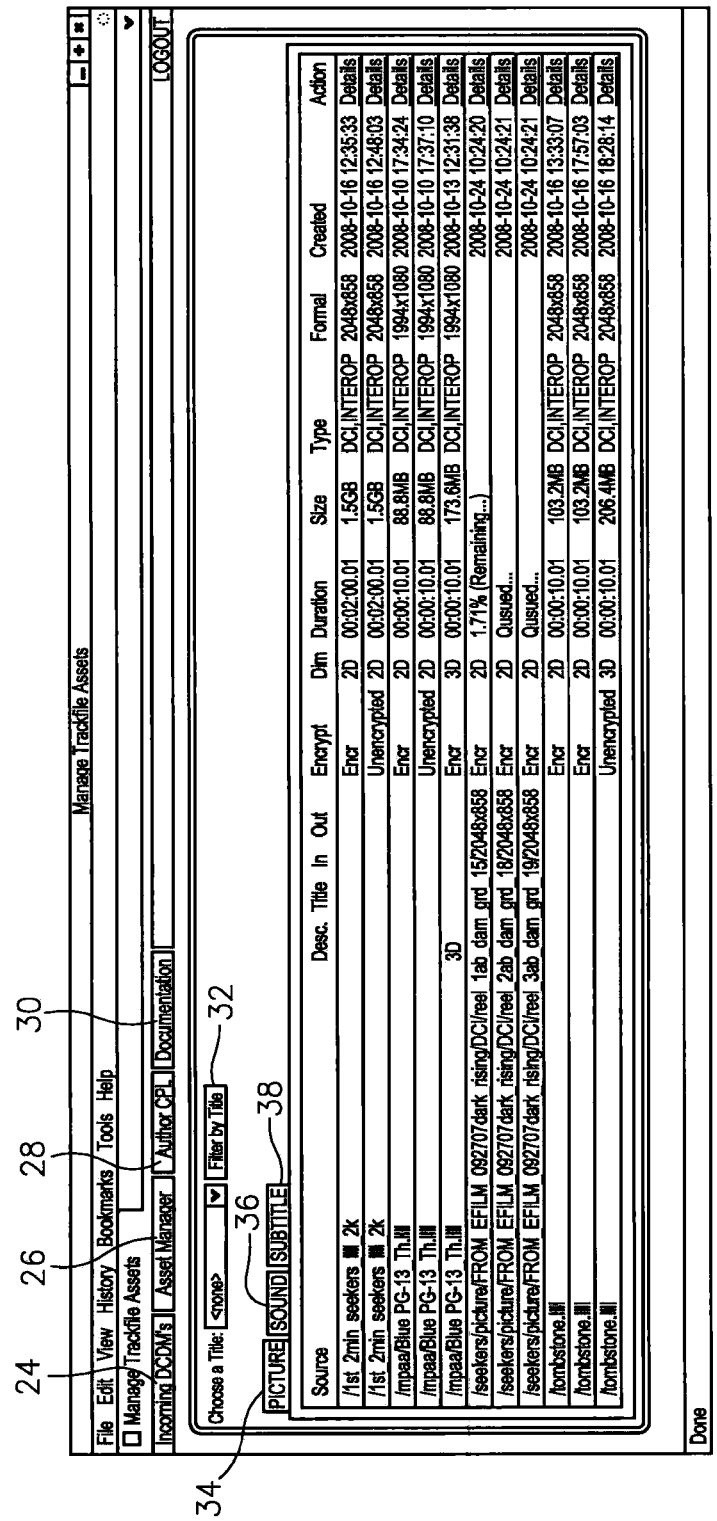
FIG. 2 is an exemplary screenshot of a packaging asset manager.

FIG. 2 illustrates a first screenshot an exemplary platform for generation of CPLs by authorized individuals. The upper left area of the screenshot shows four tabs: Incoming DCDMs 24, Asset Manager 26, Author CPL 28 and Documentation 30. The exemplary Asset Manager tab has been selected. The user has the ability to filter results by title at 32 and to view results by content type, e.g., Picture at 34, Sound at 36 and Subtitle at 38. Qualifying system assets available for generation of a CPL are then displayed, with various optional identifiers, such as source name, description, title, encryption status, 2D or 3D version information, duration, file size, file types, display format and creation date.

Figure 3:
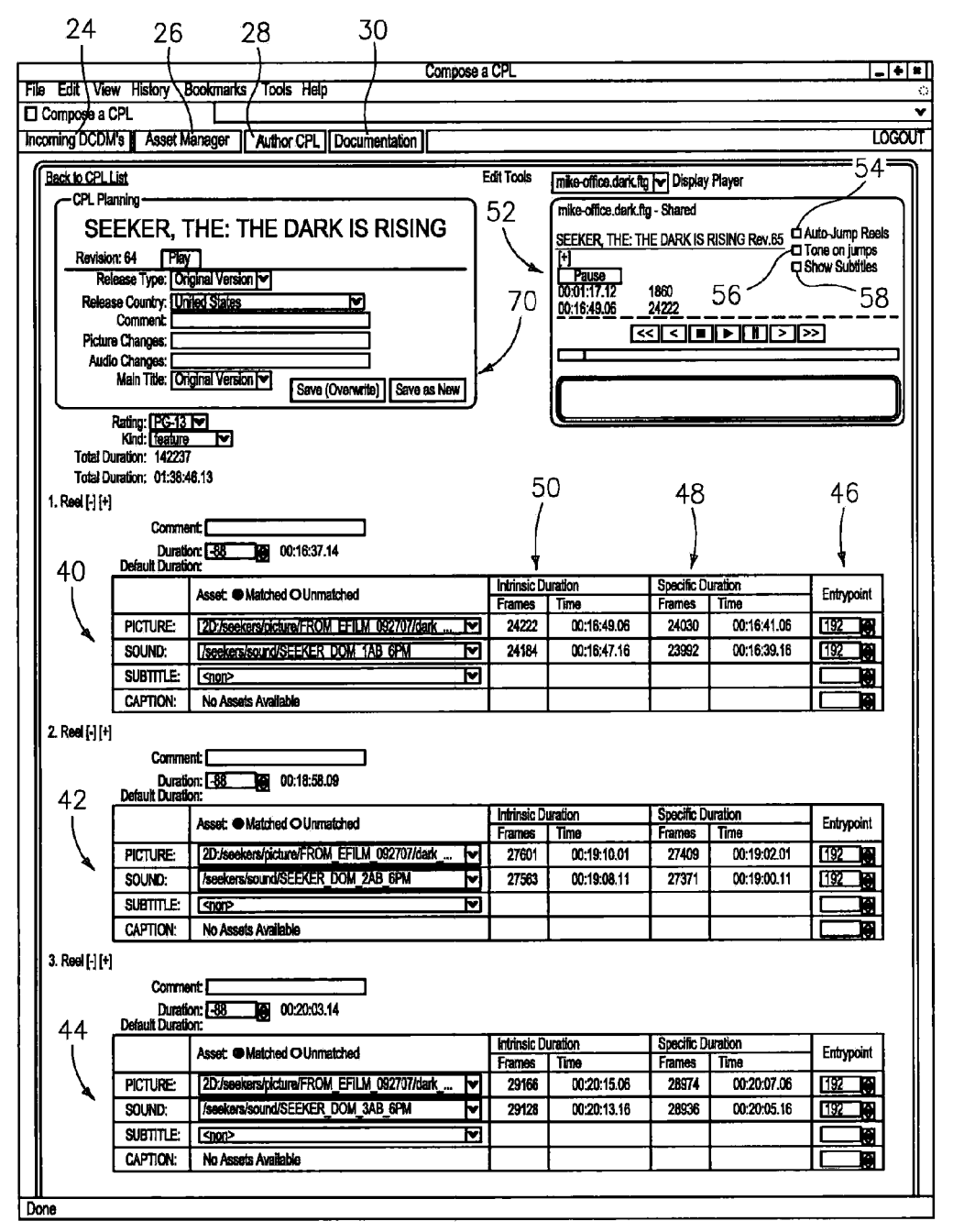

FIG. 3 illustrates an exemplary Author CPL tab 28. As may be seen from the exemplary tool, the user has the ability to select various picture, sound, subtitle and caption files for display at a given point in the movie (as sequential reels 40, 42 and 44). For any given reel, the user also has the option of setting the entrypoint into any file at 46 and the duration 48 of play of the file (note that the intrinsic duration 50 of the file is also displayed for informational purposes). A display player 52 is also provided to show the user the resulting product based on the selected materials, including various specified durations and entrypoints. Such player may illustrate picture and/or sound and/or subtitles and captions. The player may include options to automatically move to the next reel in sequence ("Auto Jump Reels" 54), generate a tone on auto jumping 56, and/or show subtitles, 58.

Figure 4:
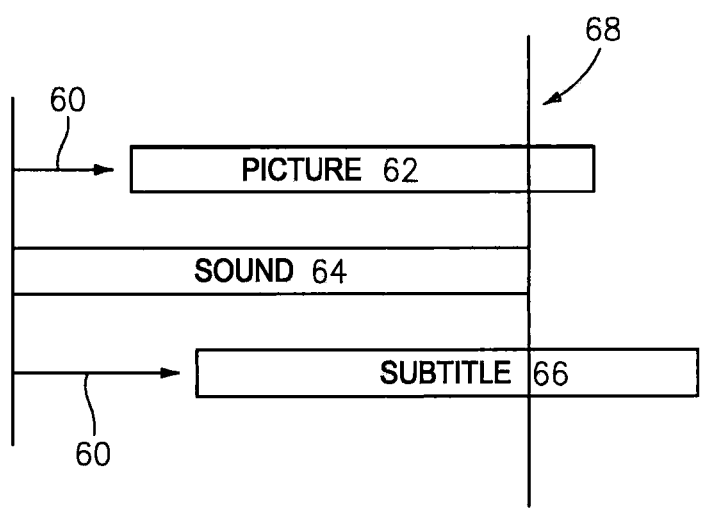
FIG. 4 is a flowchart illustrating exemplary editing of CPLs via a media player.

While not specifically illustrated in FIG. 3, the player may also have edit tools (e.g., slidable entrypoint markers, duration markers, and/or offset (relative to other files) corresponding to the information displayed in the reels 40, 42, 44. FIG. 4 is an exemplary illustration of such, wherein offsets 60 may be set for one or more picture 62, sound 64, subtitle 66, etc. files as well as an end material cutoff point 68 for such files.

As is noted, the exemplary CPL is a set of pointers or instructions relative to possible sets of MXFs. Thus, "generation" of a CPL may be likened to generation of a modifiable set of rules rather than generation of a final movie version. This is advantageous from a user interface perspective, since the user need not worry about the technical aspects of offsetting, editing and/or merging documents, but is instead allowed to manipulate possible combinations (in some cases with sliding and drag and drop type interfaces) without actually creating a final movie form (essentially creating new CPLs dynamically responding to user manipulation of the interface). Referring again to FIG. 3, progress is savable, but editable by re-opening a session via interface 70.

In exemplary embodiments, the user-friendly interface may be provided by configuring a local webpage for controlling a set of devices with device controllers that are cloned to the web server for editing such files. In such cases, existing web interface rules may be used by keeping a running time code, with for example two or three devices linked to the web interface output that can control the devices and players. In such a way, the files and/or file names need not even be viewed, and instead, the files may be abstracted as assets.

Figure 5:
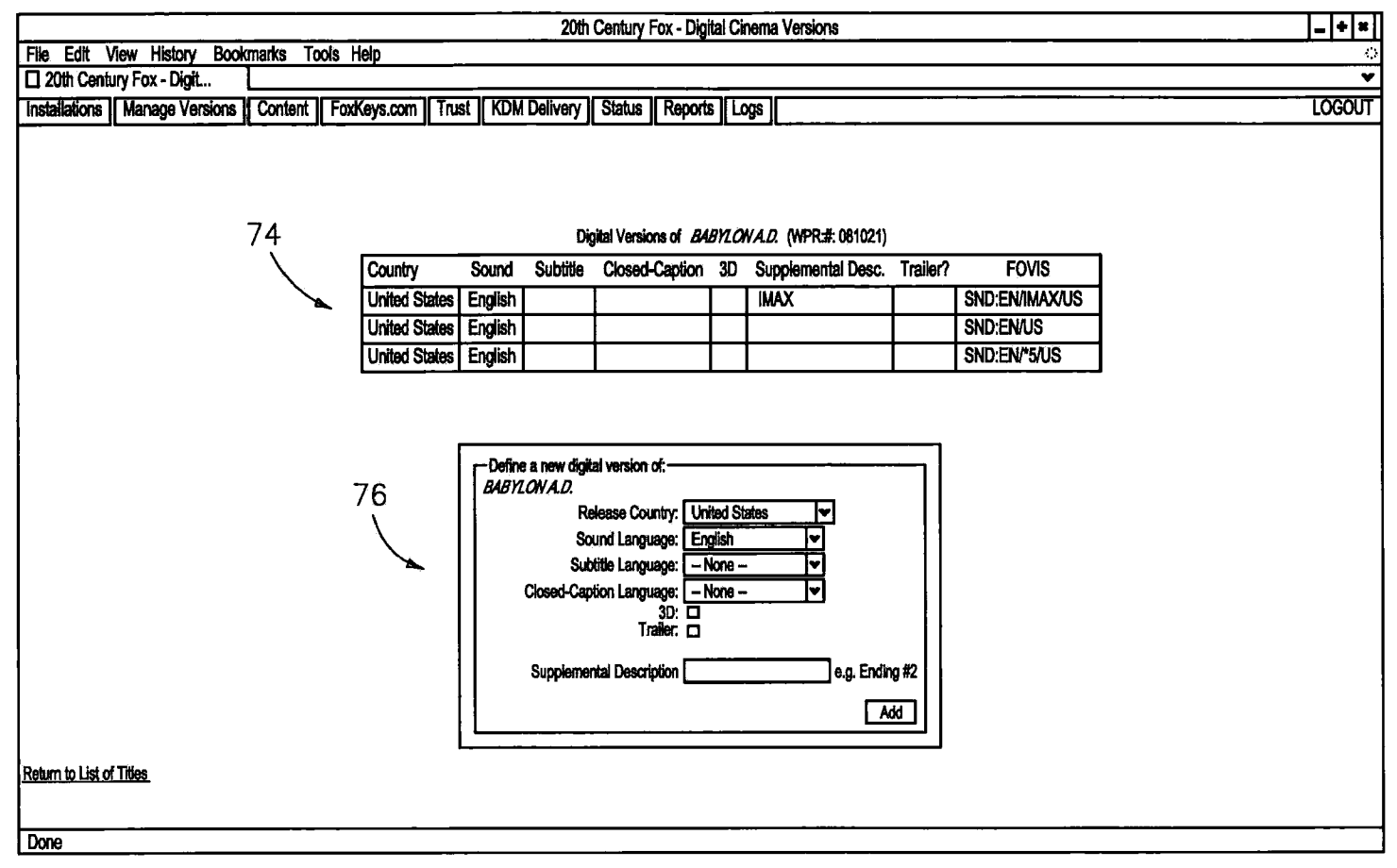

Referring again to FIG. 1, the booking component 72 may refer to a certain defined version 22, but in exemplary embodiments wherein the packaging and booking components may operate separately, the "version" 22 may first be defined as a placeholder with desired components. For example, FIG. 5 is an exemplary screenshot, wherein certain desired versions may be entered into the system for booking purposes. A box 74 lists various version placeholders, and box 76 provides an entry point for additional desired versions, specifying e.g., a release country, sound language, subtitle language, closed captioned language, film type, trailer indication and/or supplemental description.

Figure 6:
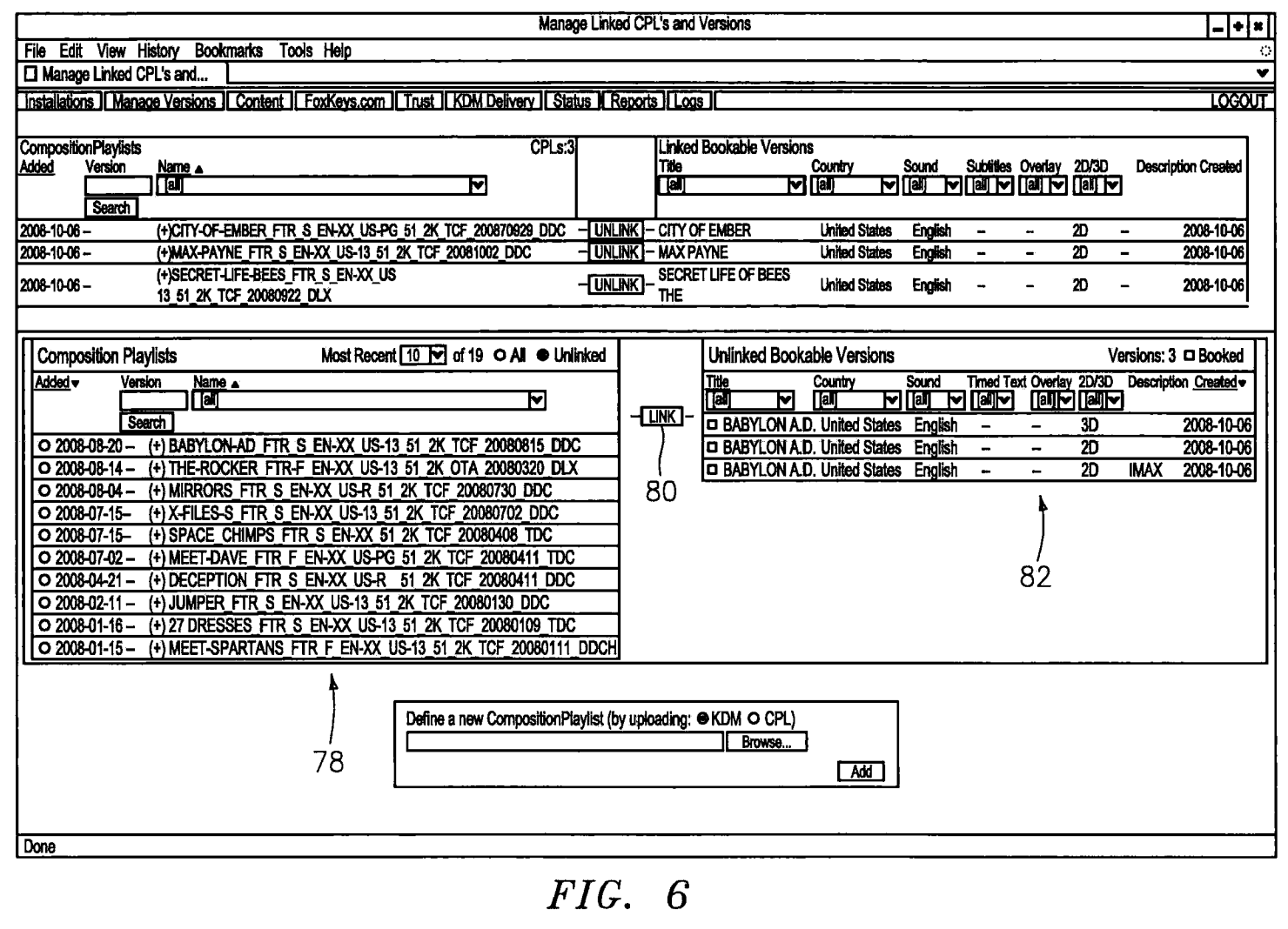

FIG. 6 is an exemplary screenshot, wherein various generated CPLs (see the exemplary column at 78) may be linked or unlinked (see action button 80) to versions 22 (see the exemplary column at 82) to connect the booked versions to desired CPLs.

In exemplary embodiments (where one cares about maintaining the security of master copies) both the booking and delivery and the packaging platforms rely on interaction with the KDM component. As was also described above, where a packaging process is performed in a secure, authorized environment, encryption keys may be generated as a matter of course, without specific authorization having been scheduled. However, with a booking of, e.g., an auditorium, KDMs should be generated with particularity if the greatest measure of security is desired.

Figure 7:
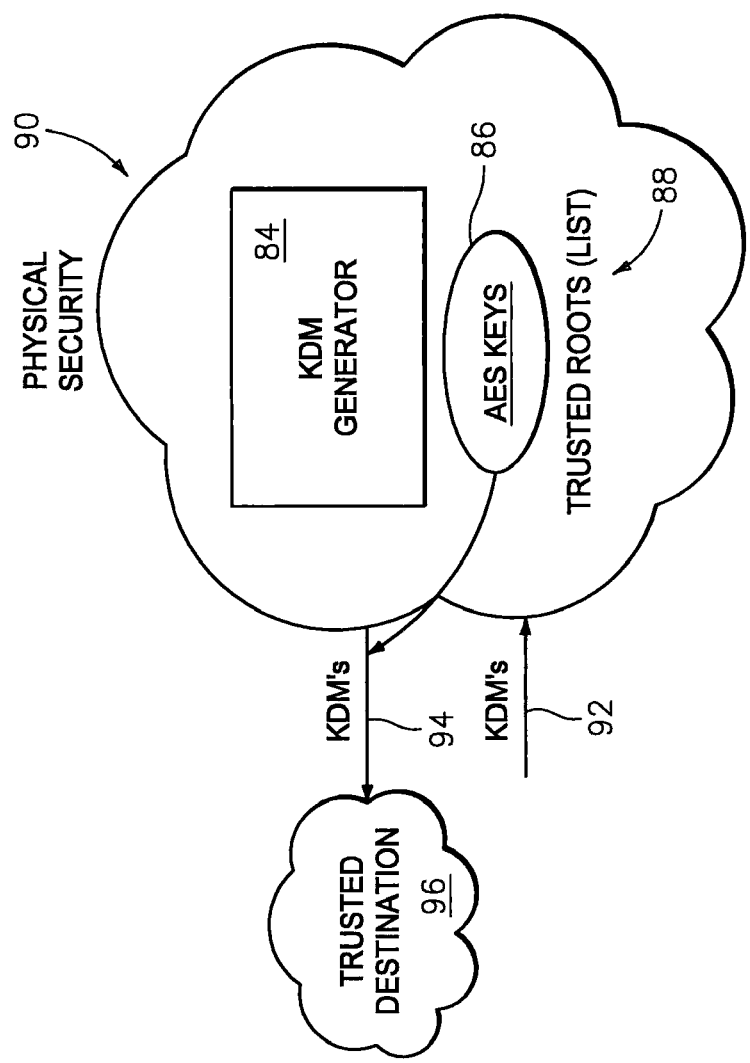
FIG. 7 is an exemplary flowchart illustrating KDM generation and delivery to trusted destinations.

Referring to FIG. 7, in general, an exemplary (and secure) KDM component has a KDM generator 84, AES keys 86 and a Trusted Roots (List) 88 that are maintained in a physically secure environment 90. KDM requests pass into the secure environment (see arrow 92), and keys are passed out from the secure environment (see arrow 94), as long as such environments are trusted destinations 96.

Where maximum security is desired, KDM distribution is dependent upon delivery to a trusted device 98 within the device configuration 100 of the auditorium 12. That is, the destination must have a trusted authorized certificate in order for KDM delivery to occur. In exemplary embodiments, external service providers 102 may be used to scan such devices 98 to verify trust, wherein reported certificates may be compared against the trusted list of roots within the KDM component As was noted above, in exemplary embodiments relating, e.g. to movie theaters, KDMs are generated for specific bookings, including auditorium, screen number, version, date and duration. FIG. 8 is an exemplary screenshot showing KDMs generated for specific movies 104, 106, 108 shown on specific screens at specific times. Thus, the booking component, the KDM component, including trusted device verification aspects, and version/CPL aspects all interrelate as a dynamic database for serving digital content with minimal personnel interference. Further, the above aspects operate in parallel to maximize efficiency of delivery and security (integrating booking and key delivery). Use of external service providers 102 to verify devices 100 minimizes or eliminates down time due to, e.g., device swaps or upgrades, and linking of versions and CPLs completes the chain for delivery.

Figure 9:
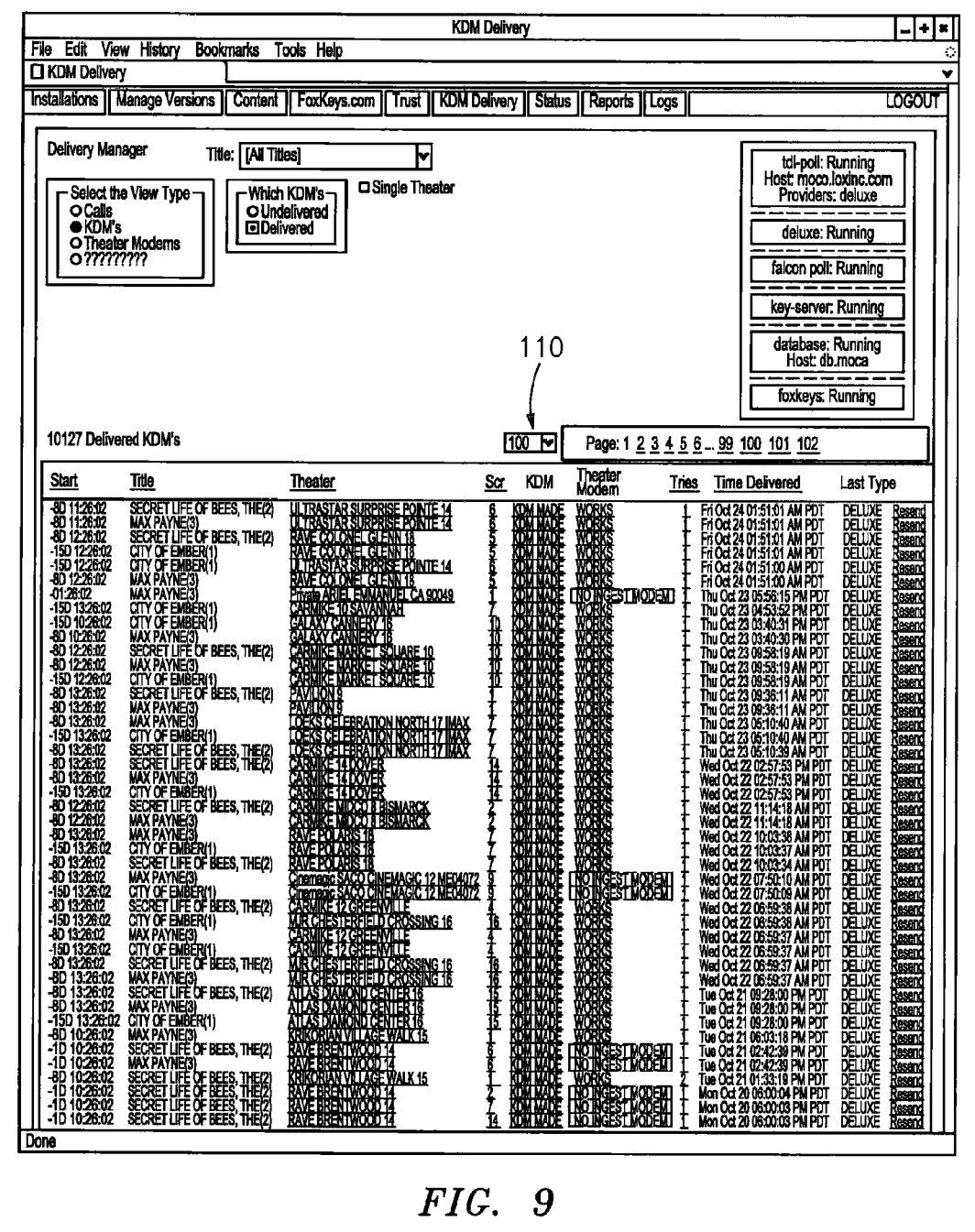

Further, the system may be configured to constantly look to verify the existence of proper KDMs for materials and bookings (e.g., in a left join process to verify key generation). For example, if devices are swapped at the exhibitor end, it is possible that old KDMs are invalid, or that additional fulfillment needs to occur. The system may be configured to continually check to verify that KDMs have been made, are current, and have been delivered. This type of construction also provides the ability to accurately log all KDM conditions, such as is illustrated generally at 110 in FIG. 9.

In exemplary embodiments, distribution is provided via a remote access server (RAS), which may be used as a KDM proxy. In exemplary embodiments, a problem arises in circumstances where all third parties utilize the same internet protocol (IP) address (since all third parties must output KDMs). Delivery is an important part of the system, and in exemplary embodiments PPP protocol may be used. If the IP address is the same for all third parties (e.g., all theaters), general conflicts would arise where multiple connections are desired (e.g., establishing 20 connections simultaneously to 20 theaters). Where telephone lines are utilized, the theaters do not have discernible network interface card (NIC) identifiers.

In an exemplary embodiment, such conflicts are resolved by utilizing packet flagging in conjunction with virtual routing tables. By this process, concurrent sessions may be initiated over telephone lines by uniquely targeting specific theaters.

In exemplary embodiments, the system is configured to package digital cinema that may be displayed by exhibitors in a format and/or resolution that is equal to or better than that of traditional 35 mm Answer Print. Also, in exemplary embodiments, the system is based around global standards such that content may be distributed and exhibited anywhere in the world (as can be done with traditional 35 mm print).

In exemplary embodiments, the system is also based upon a discrete component architecture (e.g., Mastering, Compression, Encryption, Transport, Storage, Playback, Projection) that allows for components to be replaced or upgraded without replacement of the entire system.

Also, in exemplary embodiments, the encryption format is a single common encryption format with common keys for decryption of content. The content may be encrypted from the time of encoding in post-production all the way until it is projected on an exhibitor's screen. Decryption keys may be provided only to authorized entities via secure data transmission environments or via physical delivery. In other exemplary embodiments, the system included capacities to renew or replace encryption components in case of a breach of security. In other exemplary embodiments, encryption components are specific to an exhibitor.

In additional exemplary embodiments, packaged digital cinema includes forensic marking of the content for providing traceable forensic evidence in the case of a theft of the content. Such marking may be specific to the system, generally, or specific to the exhibitor.

It will be apparent to those skilled in the art that, while exemplary embodiments have been shown and described, various modifications and variations can be made to the system for distributing digital media to exhibitors disclosed herein without departing from the spirit or scope of the invention. Accordingly, it is to be understood that the various embodiments have been described by way of illustration and not limitation.

What is claimed is:

1. A system for administering a digital media distribution process, comprising:
a packaging platform, including:
a packaging component, wherein said packaging component securely converts unencrypted, uncompressed media into encrypted media files; and
an encryption key component that is configured to deliver or provide access to an encryption key necessary to display the encrypted digital media files for personnel or terminals authorized to manipulate said encrypted media files, wherein encryption keys are automatically generated from encryption databases in response to a packaging request from said authorized user or said authorized terminal; and
wherein said packaging component is configured such that said authorized user or said authorized terminal may generate an arrangement of plural encrypted media files that together comprise a packaged media; and
a booking platform, including:
a central database system:
a booking component that contains information about available encrypted digital media content and processes bookings for a media viewing;
wherein said encryption key component automatically generates encryption keys from encryption databases in response to bookings made for specific viewings, and for specific trusted viewing equipment; wherein said arrangement comprises a composition playlist file (CPL) that defines the temporal placement of said plurality of media files relative to one another in order to achieve a desired synchronization during viewing of said packaged media; and further comprising a packaging interface for managing media assets and constructing CPLs, wherein said packaging interface links to or displays incoming unencrypted digital cinema digital master (DCDM) files, links to an asset manager and provides tools for authoring a CPL, including plural reel construction interface areas setting picture, sound and subtitle information selected from media asset sources, as well as duration and entrypoint values, the CPL comprising a set of pointers or instructions relative to the plural defined reels.

2. A system in accordance with claim 1, wherein said media content comprises digital cinema, wherein said trusted viewing equipment comprises cinema exhibitor equipment, and wherein said keys are automatically generated from encryption databases in response to bookings made for specific exhibitors, specific showings and media versions and specific trusted exhibitor equipment.

3. A system in accordance with claim 1, wherein said encryption keys are generated from AES symmetrical keys stored in an encrypted database.

4. A system in accordance with claim 1, wherein said encryption key component delivers said encryption key to the trusted equipment via modem, via webpage or via third party delivery.

5. A system in accordance with claim 1, wherein said encryption keys comprise key delivery message (KDMs) that are generated by a KDM component based upon secure AES keys.

6. A system in accordance with claim 5, wherein said KDMs are generated for each individual authorized viewing on equipment verified as trusted from a secure trusted roots list.

7. A system in accordance with claim 6, wherein equipment certificates are provided from outside the booking and KDM components, and wherein the KDM component verifies the certificates based on the secure trusted roots list.

8. A system in accordance with claim 5, wherein the system performs a left join, repeatedly checking to see if a valid KDM exists for an existing booking and if existing KDMs are current, and generates a KDM for any changes to a trusted device.

9. A system in accordance with claim 5, wherein a booking database schedules bookings based on desired definable versions of media, the versions defining one or more of a release country, audible language, subtitle language, closed caption language, and media format.

10. A system in accordance with claim 9, wherein said KDMs are generated for specific trusted devices for a defined booked duration.

11. A system in accordance with claim 10, wherein a logging interface provides detailed KDM information, including accountings of delivered KDMs and undelivered KDMs.

12. A system in accordance with claim 9, wherein the system includes a user interface for linking desired definable versions to a composition playlist (CPL) file, which file provides instructions for assembling a version from a plurality of media files.

13. A system in accordance with claim 12, wherein said CPL defines the temporal placement of said plurality of media files relative to one another in order to achieve a desired synchronization during exhibition.

14. A system in accordance with claim 13, wherein said CPL includes instructions for assembling less than the total number of media files that are transmitted to the exhibitor.

15. A system in accordance with claim 12, further comprising a packaging interface for managing media assets and constructing CPLs.

16. A system in accordance with claim 15, wherein said packaging interface includes a filterable asset manager, which provides categorized listings of available media assets for use in generating a CPL.

17. A system in accordance with claim 16, wherein said asset manager allows filtering by title.

18. A system in accordance with claim 16, wherein said asset manager allows filtering by media type, comprising picture, sound and subtitle.

19. A system in accordance with claim 16, further comprising a CPL generating interface, said interface configured to permit the user to arrange select media files on a timeline relative to one another and to specify start and stop points of various arranged media files in order to generate a CPL corresponding to a desired media version.

20. A system in accordance with claim 19, wherein cinema media files may be selected for a plurality of cinema picture files, cinema sound files, cinema subtitle files and cinema closed captioning files for synchronized play of such files as a reel.

21. A system in accordance with claim 20, wherein an entrypoint for each of said files in said reel may be independently set.

22. A system in accordance with claim 20, further comprising a display player for viewing of a current CPL reel configuration result.

23. A system in accordance with claim 22, wherein said display player provides a tool for further defining offset of a media file relative to others within a reel.

24. A system in accordance with claim 22, wherein said display player provides a tool for further defining a truncation point for such reel.

25. A system in accordance with claim 22, wherein said player provides a visual or audible alarm for transition points or reel jumps.

26. A system in accordance with claim 22, wherein said player provides an auto-locate feature for jumping to an approximate beginning of subtitling.

27. A system in accordance with claim 22, wherein said player provides an auto-locate feature for edit points.

28. A system in accordance with claim 12, wherein said media files are encrypted material exchange format files (MXF).

29. A system in accordance with claim 28, wherein said KDM component automatically generates and forwards KDMs for authorized stations or users for purposes of generating a CPL.

30. A system in accordance with claim 28, wherein said MXF files are generated from one or more uncompressed, unencrypted digital cinema digital master (DCDM) files.

31. A system in accordance with claim 28, wherein said MXF files are watermarked.

32. A system in accordance with claim 28, wherein said MXF files are compressed.

33. A system in accordance with claim 1, wherein said packaging interface includes a filterable asset manager, which provides categorized listings of available media assets for use in generating a CPL.

34. A system in accordance with claim 33, wherein said asset manager allows filtering by title.

35. A system in accordance with claim 33, wherein said asset manager allows filtering by media type, comprising picture, sound and subtitle.

36. A system in accordance with claim 33, further comprising a CPL generating interface, said interface configured to permit the user to arrange select media files on a timeline relative to one another and to specify start and stop points of various arranged media files in order to generate a CPL corresponding to a desired media version.

37. A system in accordance with claim 36, wherein cinema media files may be selected for a plurality of cinema picture files, cinema sound files, cinema subtitle files and cinema closed captioning files for synchronized play of such files as a reel.

38. A system in accordance with claim 37, wherein an entrypoint for each of said files in said reel may be independently set.

39. A system in accordance with claim 37, further comprising a display player for viewing of a current CPL reel configuration result.

40. A system in accordance with claim 39, wherein said display player provides a tool for further defining offset of a media file relative to others within a reel.

41. A system in accordance with claim 39, wherein said display player provides a tool for further defining a truncation point for such reel.

42. A system in accordance with claim 39, wherein said player provides a visual or audible alarm for transition points or reel jumps.

43. A system in accordance with claim 39, wherein said player provides an auto-locate feature for jumping to an approximate beginning of subtitling.

44. A system in accordance with claim 39, wherein said player provides an auto-locate feature for edit points.

45. A system in accordance with claim 39, wherein said media files are encrypted material exchange format files (MXF).

46. A system in accordance with claim 45, wherein a KDM component automatically generates and forwards KDMs for authorized stations or users for purposes of generating a CPL.

47. A system in accordance with claim 45, wherein said MXF files are generated from one or more uncompressed, unencrypted digital cinema digital master (DCDM) files.

48. A system in accordance with claim 45, wherein said MXF files are watermarked.

49. A system in accordance with claim 45, wherein said MXF files are compressed.

50. A system in accordance with claim 1, wherein said selection from media asset sources is via a drag and drop interface function from a listing of media asset sources.

51. A system in accordance with claim 1, wherein said interface provides a listing of total duration, as well as individual reel durations, along with a film rating indicator.

* * * * *